United States Patent [19]

Shen

[11] Patent Number: 4,922,691
[45] Date of Patent: May 8, 1990

[54] SEPARATOR OF VAPORIZING OIL AND SMOKE

[76] Inventor: Hsin-Der Shen, 208, Min Shen West Rd., Taipei, Taiwan

[21] Appl. No.: 243,582

[22] Filed: Sep. 12, 1988

[51] Int. Cl.⁵ .............................................. B01D 45/12
[52] U.S. Cl. ....................................... 55/400; 55/406; 55/408; 210/107; 210/297
[58] Field of Search ................... 55/97, 400, 404, 405, 55/406, 407, 408, 435; 210/107, 297

[56] References Cited

U.S. PATENT DOCUMENTS

| | | | |
|---|---|---|---|
| 1,580,380 | 4/1926 | MacDonald | 55/400 |
| 2,109,478 | 3/1938 | Gay | 55/400 |
| 2,269,412 | 1/1942 | Sturtevant | 55/400 |
| 2,792,909 | 5/1957 | Court | 55/405 |
| 3,260,039 | 7/1966 | Brown et al. | 55/467 |
| 3,289,397 | 12/1966 | Schonewald et al. | 55/400 |
| 3,443,368 | 5/1969 | Wilson et al. | 55/435 |
| 3,447,290 | 6/1969 | Flory | 55/404 |
| 3,865,022 | 2/1975 | Ahlrich | 55/406 |
| 3,931,016 | 1/1976 | Lovelady | 55/400 |
| 4,278,450 | 7/1981 | Hurst et al. | 55/400 |

FOREIGN PATENT DOCUMENTS 774610 10/1980 U.S.S.R. ............................ 55/406

Primary Examiner—Jay H. Woo
Assistant Examiner—C. Scott Bushey

[57] ABSTRACT

Separation of vaporizing oil and smoke to clean polluted air. That is, by inducing the particles to directly impact the revolving filter drum, and some small particles to be intercepted in the meshes and some large particles to collect in the groove means, due to the rotation of blower blades. Clean air will go upwards through the revolving filter drum through a pressure effect. Automatic cleaning of the polluted revolving filter drum and groove means is achieved by rotation of an axial fan causing a centrifugal effect.

2 Claims, 3 Drawing Sheets

SEPARATOR OF VAPORIZING OIL AND SMOKE

BACKGROUND OF THE INVENTION

1. Field of the Invention

This invention is a particle removal device for air pollution control equipment. This combines the method of deposition of particles by cyclone separator, inertia impaction and interception.

2. Brief Description of the Prior Art

Separators of the general type herein considered are disclosed in the U.S. patent to Lovelady, No. 3,931,016, which has the problem of an adjustable damper to breed a small amount of filtered air back into the container. The result is only a small portion of the non-filtered air can be sealed off, and the edge of the rotating blades will exit the large particles, thus the efficiency is low. Downstream design of U.S. patent to Hurst, No. 4,278,450 can not fully clean the Pyrolytic off-gas, the efficiency is obviously low, as the organic vapor is lighter than the Pyrolytic off-gas; for best cleaning results, the method should reverse the flow direction of the organic vapor. Therefore, a long standing need has existed to improve the above machines in order to increase the efficiency of separation, and to create a simple mechanism to clean out the finest particles and automatic cleaning to make possible long term usage without replacing the filter drum.

SUMMARY OF THE INVENTION

This invention relates to an exhaust pollution air treatment apparatus and, more particularly, to an apparatus for separating the vaporizing oil and smoke utilizing the separation of particles by cyclone, inertia impaction, interception and automatic cleaning, thereby cleaning the air.

The object of this invention is separation by inertia impaction and interception, that is, by inducing exhaust particles through a diverge-converge means and impacting the revolving filter drum with its multiple layers and extremely fine meshes. When the size of the particles is larger than the size of the mesh in either of the multiple layers, the particles will either intercept in the meshes of the revolving filter drum or impact following flow streamlines.

Another object of this invention is to separate by cyclone. That is, by utilizing fan blades under the converge-diverge means and revolving filter drum, rotation will, after inertia impaction, force the particles to collide in the groove means mounted in an outer case.

Still another object is that after the separation by inertia impaction, interception and cyclone, the clean air will flow upwards to penetrate the revolving filter drum. The rotation of the fan blades and the induction of exhaust flow, because of the converge shape under the extension of the outer case, will cause a high pressure area to force the clean air through the finest meshes of the rotating drum.

A further object of this invention is automatic cleaning. An axial-flow fan in the center of the revolving filter drum will either guide the clean air out in a clockwise direction, or, pour the dilution inside the filter drum in a counterclockwise direction, creating a centrifugal effect which will wash the revolving filter drum and the groove means; the particles will then slide down to the collecting means.

DETAILED DESCRIPTION OF THE INVENTION

Figure 1:
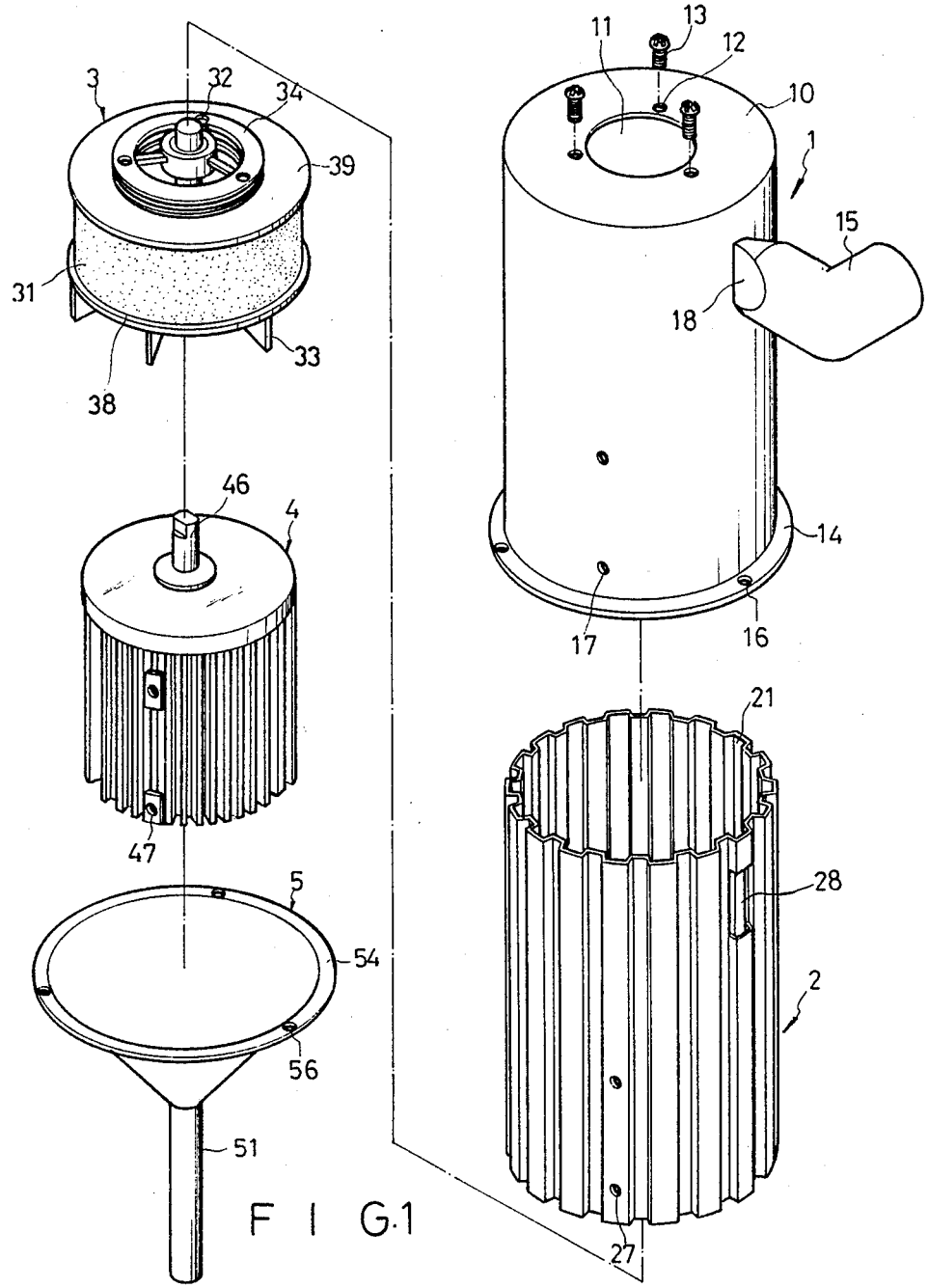
FIG. 1 shows the disassembled view of the invention.
Figure 2:
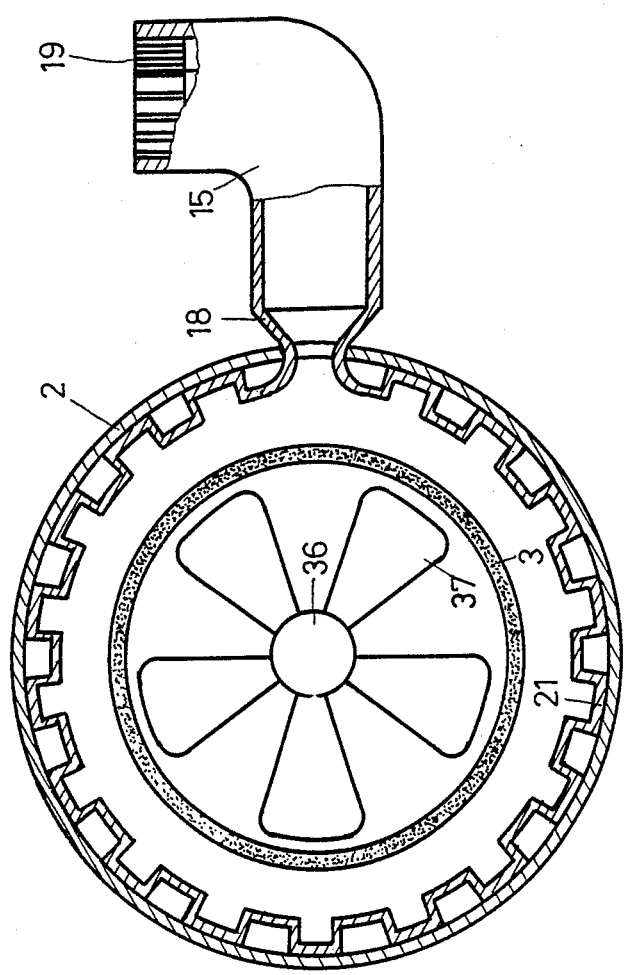
FIG. 2 is the cross section of the invention to show how the vaporizing oil and smoke enter into the invention.
Figure 3:
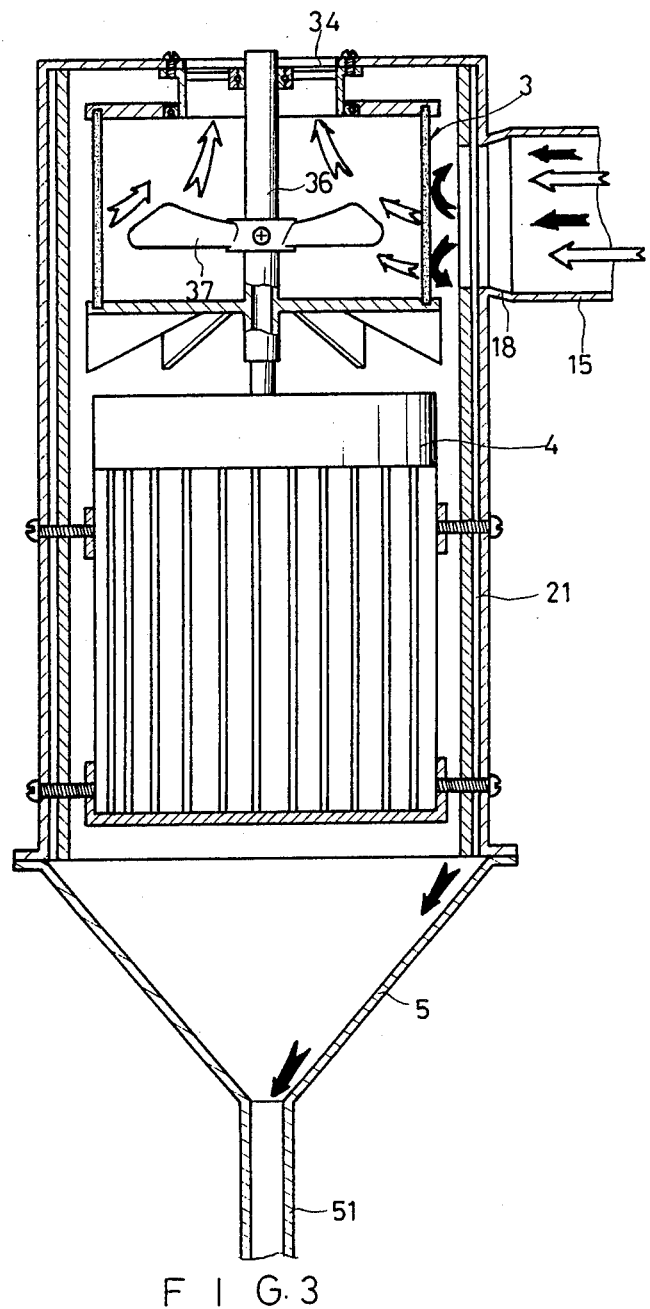
FIG. 3 is the vertical section to show how the vaporizing oil and smoke enter into this invention.

Referring to the drawing, the present invention of a cylinder includes a converge-diverge means [18] for entraining vaporizing oil and smoke, an outer case [1] in drum shape with exhaust air outlet [11] on the top and a lining [2] within the outer case [1]. A filter drum [3] inside the lining [2] is connected to the shaft [46] of a motor [4], both move together. A converge shape means [5] is linked to the opening on the bottom of the outer case [1]. The converge-diverge means [18] is connected to a duct [15] extended to a inhaling electrid fan [19]. The converge-diverge means [18] will help condense the particles from the duct [15] and direct them to the filter drum [3]. The bottom of the outer case [1] has a flange [14] for connecting the converge shape means [5]. The purpose of the converge shape means [5] is to cause back pressure so as to let the clean air upwards to pass the filter drum [3].

Corresponding to the position of the converge-diverge means [18] on the outer case [1], is a guide inlet [28] on the lining [2] for the entrance of the vaporizing oil and smoke. The cross section of the lining [2] is in the shape of multi-grooves, named a groove means [21], which is connected to the outer case [1]. The entraining exhaust gas from the inhaling electric fan [19] passes through converge-diverge means [18], and impacts the filter drum [3], and collides in the groove means [21] by the cyclone effect created by the fan blades [33].

There are several holes [17] near the bottom of the cylinder of the outer case [1] for locking the motor. A hole [27] is in the lining [2], corresponding to the hole [17] of the outer case [1] and the holes [47] of the motor [4], all to be screwed together. The motor shaft [46] is connected to the shaft [36] through a key and a connector, therefore, the axial fan [37] revolves synchronously with the filter drum [3], the fan blades [33] and the motor shaft [46]. A screw hole [47] bolts an outer hole [17] and an inner hole [27] so as to fix the motor in the outer case [1]. The converge shape means [5] is bolted through holes [56] on the flange [54] to holes [16] on the flange [14] of the outer case [1].

The filter drum [3] is in the shape of a cylinder consisting of upper and lower round plates [38] [39] connected to multiple-layer screens [31] together, forming a revolving filter drum. A shaft [36] penetrates through the center of lower round plate [38] and fixes the fan blades [33] located under the lower round plate [38]. The upper round plate [39] has a large hole in the center, around which a sealed bearing, or a wool packing is mounted to prevent unfiltered air escaping. The center hole of the upper round plate [39] is also for penetration of the shaft [36] and discharge of the clean air. The shaft [36] is secured to a bearing block [34] which has several screw holes [32] corresponding to the holes [12] on the top of outer case [1]. The screw holes [32] will be fixed by the screws [13] to the bearing block [34] on the top [10] of the outer case [1]. The bearing block [34] is fully sealed to the upper round plate [39] allowing only the clean air to go out, or, the addition of dilutions for the automatic washing. The bearing block [34] with ribs extending radially toward the center is held by a bearing to allow shaft [36] rotation. An axial fan [37] is fastened to the shaft [36] and is located between the upper and lower round plates [39] [38] to guide, under clockwise rotation, the clean air upwards through the multiple-layer screens [31] to the outer area [11].

The multiple-layer screens [31] can also be washed when the dilution is added from the outer area [11] to the inside of the filter drum [3], and the axial fan [37] turns counterclockwise. The liquid will be forced by a centrifugal effect to clean out the filter drum [3] and the groove means [21]. A converge shape means [5] can also accept the flowing liquid together with washed particles from the downstream of the groove means [21]. The extension of the converge shape means [5] is an exhaust pipe [51]. The exhaust pipe [51] will be connected to a vessel (not shown) to collect the washed liquid or recycled oil. The collecting means comprises the converge shape means [5], the exhause pipe [51] and a vessel to perform a collecting job.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

Having thus described this invention, what is claimed is:

1. An apparatus for cleaning contaminants from an exhaust gas comprising:
    a cylindrical outer casing enclosure;
    a convergent-divergent inlet means for introducing said exhaust gas into said casing; a rotatable filter drum supported inside said casing by a drive shaft arranged along the longitudinal axis of said casing; said drum being axially located by means of a bearing block such that filter media arranged circumferentially around said drum directly faces said exhaust gas inlet means; said bearing block providing an operatively sealed clean gas outlet from said drum and said casing, thereby preventing escape of unfiltered exhaust gas;
    reversible drive motor means located within said outer casing for driving said shaft selectively in a clockwise or counterclockwise direction; centrifugal fan means secured to said shaft below said rotatable filter drum and gas inlet means; lining means having a plurality of grooves secured within said outer casing, said grooves collecting contaminants separated from said exhaust gas; an axial flow fan located inside said rotatable filter drum and secured to said drive shaft; and conical contaminant collection means secured to the bottom of said outer casing.

2. The apparatus of claim 1 wherein said filter drum comprises multiple layers of filter media having differing mesh sizes.

* * * * *